United States Patent [19]
Akaike et al.

[11] 3,801,087
[45] Apr. 2, 1974

[54] HYDROPNEUMATIC IMPACT ABSORPTIVE DEVICE

[75] Inventors: Seiji Akaike; Kenichi Maemori, both of Atsugi, Japan

[73] Assignees: Nissan Motor Company Limited; Atsugi Motor Parts Company, Limited

[22] Filed: July 29, 1971

[21] Appl. No.: 167,148

[30] Foreign Application Priority Data
Aug. 4, 1970   Japan.............................. 45-67686

[52] U.S. Cl. .................................. 207/139, 293/1
[51] Int. Cl. .................................. F16f 5/00
[58] Field of Search........ 267/139, 116, 64 R, 64 A, 267/64 B, 1; 293/85, 86

[56] References Cited
UNITED STATES PATENTS
2,600,060   6/1952   Lopes et al. ....................... 293/85
3,316,558   5/1969   Mortensen ....................... 267/64 R Primary Examiner—James B. Marbert
Attorney, Agent, or Firm—Robert E. Burns; Emmanuel J. Lobato

[57] ABSTRACT

An impact absorptive device is disclosed which uses a hydroneumatic spring unit. The spring unit has a gas compartment filled with a gas under pressure and a liquid compartment filled with liquid. The gas and liquid compartments are divided by movable partition means and the liquid compartment is further divided into two liquid chambers which communicate with each other by restricted passage means. The spring unit is connected to a fender through a piston unit which is longitudinally movable in the spring unit. As the fender is subjected to an impact, the piston unit is forced to retract in the liquid compartment so as to exert a liquid pressure on the movable partition means until the gas compartment is critically contracted. The energy of the impact is thus consumed in the forced contraction of the gas compartment. A typical application of the device is a bumper of an automotive vehicle.

8 Claims, 14 Drawing Figures

HYDROPNEUMATIC IMPACT ABSORPTIVE DEVICE

This invention relates to impact absorptive devices and, more particularly, the invention appertains to an impact absorptive device of the position-restorable type which is contractable when subjected to a colliding impact and extensible when cleared of such impact. The impact absorptive device according to this invention is specifically adapted for use as a bumper of automotive vehicles for mitigating collisions encountered by the vehicles.

An object of this invention is to provide a new and useful impact absorptive device having a small-sized, compact construction which is easy to manufacture and which is ready for installation in a restricted working position.

Another object is to provide a new and useful impact absorptive device of the position-restorable type which is operable repeatedly without replacement of parts and elements.

Still another object is to provide a new and useful impact absorptive device capable of absorbing mechanical shocks and impacts in stable conditions and in a reliable manner.

These and other objects and features of this invention will become more apparent from the following description taken in conjunction with the accompanying drawings in which like reference numerals and characters designate similar parts throughout various figures and in which.

Before entering into discussion of this invention in detail, some general background of the invention would appear beneficial.

Figure 1A:
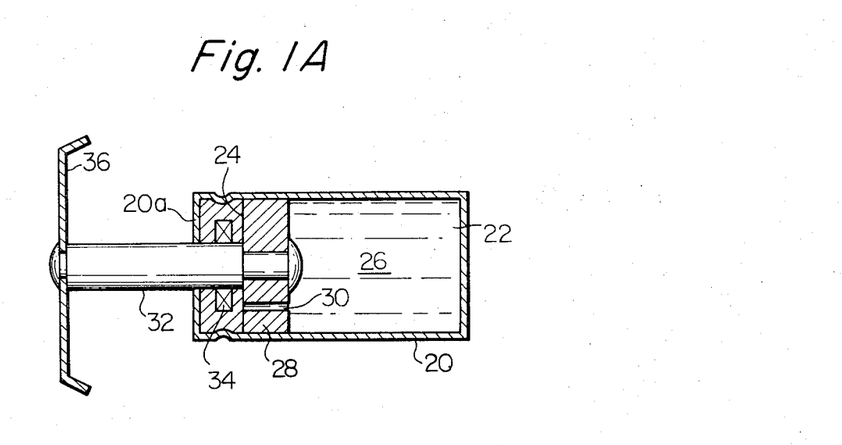
FIGS. 1A to 1D are views schematically showing typical examples of the prior art impact absorptive device of the contractable type.

One of the prior art contractable-type impact absorptive devices is a device using a hydrostatic spring a typical example of which is shown in FIG. 1A. The hydrostatic spring is comprised of a closed cylinder 20 which is filled with liquid indicated by 22. The cylinder 20 is internally divided into two chambers 24 and 26 by means of a piston head 28 having a passage 30 providing liquid communication between the two chambers. A piston rod 32 projects from the piston head 28 and extends outwardly of the cylinder 20 through an annular seal 34 and an end wall 20a of the cylinder. The piston rod 32 is connected at its leading end to a fender 36 which may be a bumper of an automotive vehicle. The impact absorptive device of this nature operates on the appreciable compression of the liquid in the cylinder when the fender undergoes a colliding impact. The liquid is subjected to expansion as a result of the rise in temperature of the liquid so that the pressure in the liquid fluctuates from time to time depending upon the ambient temperatures. This causes the hydrostatic spring to be unable to operate in a stable condition. Provision of a temperature control device to remedy this difficulty would result in other difficulties which may include complicated and large-sized construction of the hydrostatic spring.

Figure 1B:
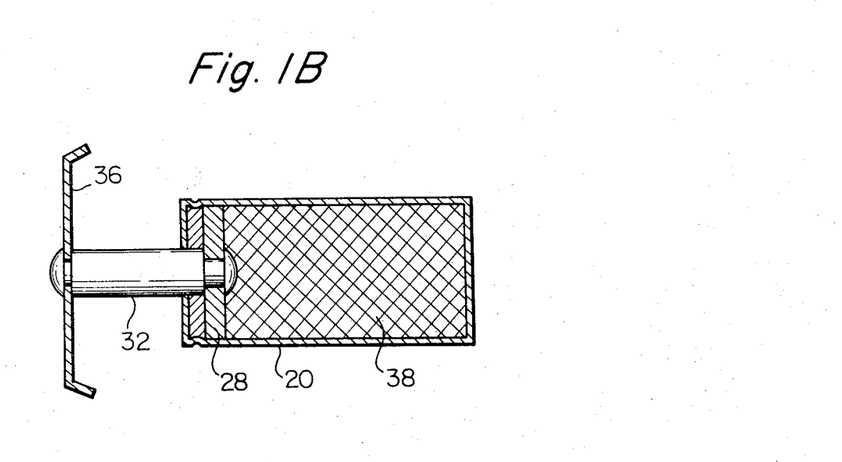
Figure 1C:
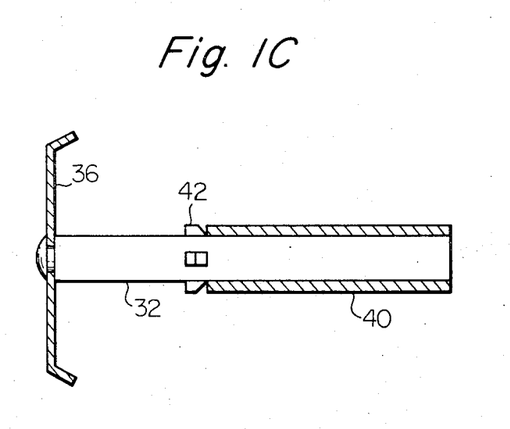

FIG. 1B illustrates a known impact absorptive device using a collapsible honeycomb structure 38 which is encased in a cylinder 20. The honeycomb structure 38 is collapsed by movement of the piston head 28 and piston rod 32 when the fender 36 is subjected to a collision condition, whereby the impact resulting from the collision is absorbed through the collapse of the honeycomb structure. An equivalent of the impact absorptive device of this type is illustrated in FIG. 1C in which a collapsible cylinder 40 is forcibly expanded by a push-knife 42 secured to the piston rod 32 when the fender 36 is forced toward the cylinder, whereby the energy of the collision is consumed in the plastic deformation of the cylinder. Since, thus, the honeycomb structure 38 and the collapsible cylinder 40 of the conventional impact absorptive devices shown in FIGS. 1B and 1C are destroyed in operation, such devices become no longer serviceable once they have operated and must be replaced with new ones that are usually expensive.

Figure 1D:
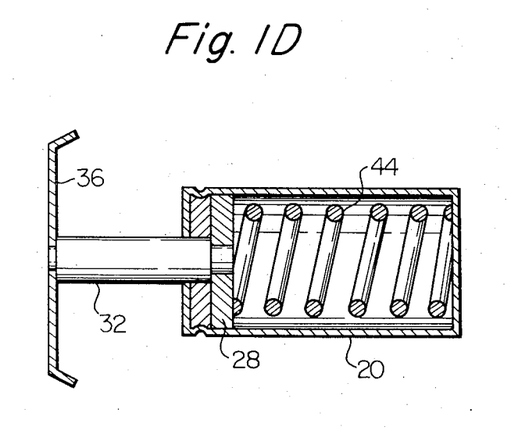

Another example of the known impact absorptive devices is a device using a compression spring. As seen in FIG. 1D, the compression spring 44 mounted within the closed cylinder 20 is seated on the piston head 28 and bears the force of the impact which is transmitted thereto through the fender 36 and piston rod 32. The force of the impact being solely borne by the spring 44, it is difficult to have the energy of the collision dissipated at a satisfactory efficiency. In order that the spring 44 be capable of absorbing an energy of a considerably great magnitude, it is important to use a coil spring having a sufficiently large coil diameter which will be reflected by an enlarged construction of the device in its entirety. When, moreover, the collision condition is removed and the fender permitted to restore its initial position, the energy accumulated in the compression spring is mostly returned to the fender causing the automotive vehicle to be violently rebounded.

These drawbacks which are inherent in the existing impact absorptive devices are completely eliminated in the device according to this invention, which comprises a bored stationary casing or cylinder having closed and apertured end walls, movable partition means dividing an elongated bore in the casing into gas and liquid compartments which are respectively filled with a gas under pressure and incompressible or appreciably compressible liquid, liquid separating partition means dividing the liquid compartment into two chambers, passage means providing liquid communication between the two chambers, a piston projecting into the liquid compartment and extending outwardly of the casing through the apertured end wall thereof, and a fender rigidly connected to an outermost end portion of the piston. The gas and liquid compartments are expansible and contractable as the movable partition means is moved longitudinally of the casing. One of the two chambers formed in the liquid compartment is adjacent the gas compartment through the movable partition means and is expansible and contractable as the liquid in the liquid compartment is forced to flow from one of the two chambers to the other through the passage means so that a liquid pressure exerted on the movable partition means is varied. The piston is movable longitudinally of the liquid compartment for causing the liquid in the liquid compartment to flow from one of the two chambers to the other. When the fender is subjected to an impact which is directed toward the casing the piston projecting from the casing is forced to retract in the liquid compartment so as to give rise to the liquid pressure in the chamber which is adjacent the gas compartment whereby the gas compartment is contracted and the gas therein is compressed to absorb the energy of the impact.

Preferred embodiments of the impact absorbing device having the above defined basic construction will now be described with reference to the accompanying drawings.

Figure 2:
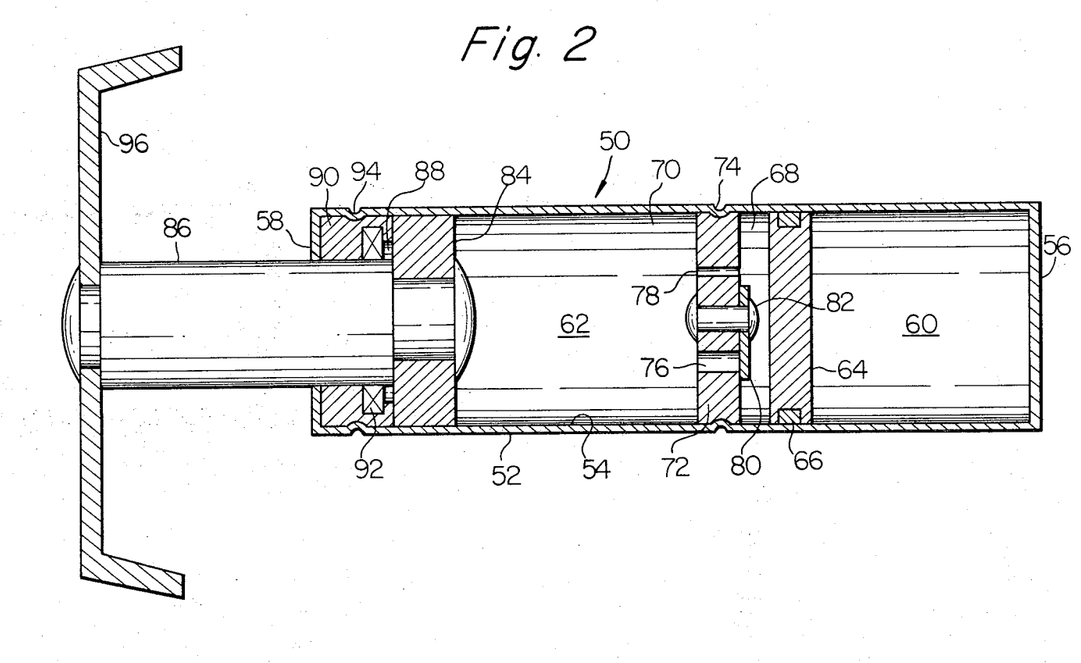
FIG. 2 is a longitudinal sectional view of a preferred embodiment of the impact absorptive device according to this invention, the shown device being in an inoperative condition.
Figure 3:
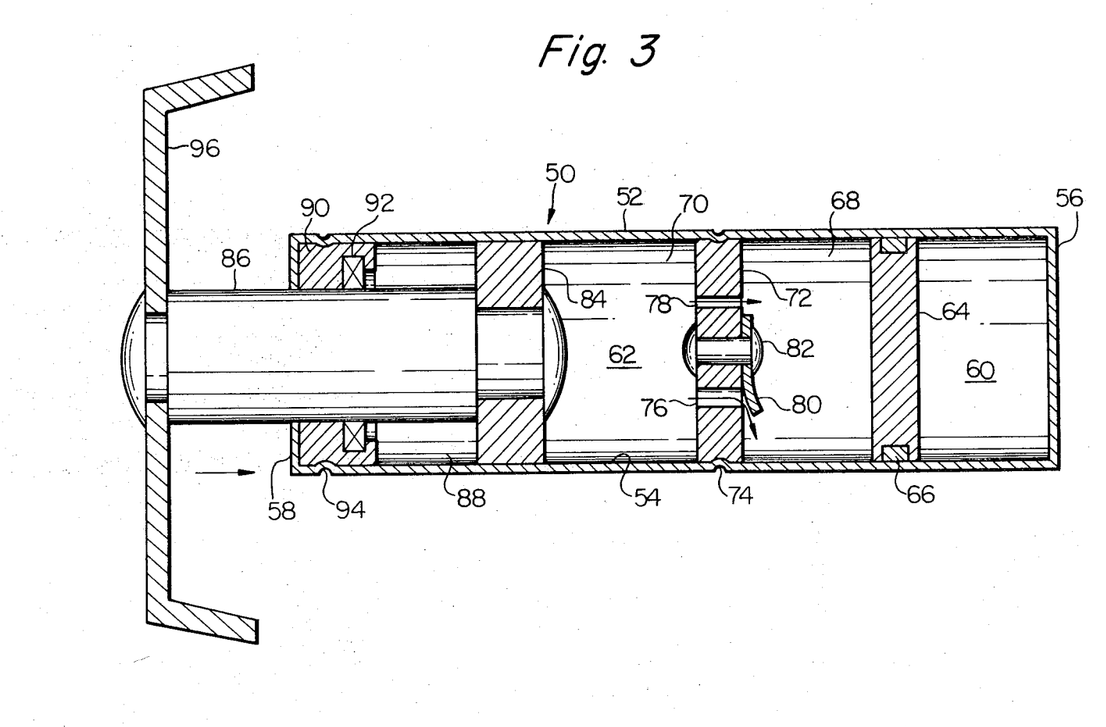
FIG. 3 is a view similar to FIG. 2 but shows the device which is in an operative condition responding to a collision condition.

Reference is first had to FIGS. 2 and 3 in which the hydropneumatic impact absorptive device in a first preferred form is illustrated. The impact absorptive device as shown includes a hydropneumatic spring unit which is generally designated by reference numeral 50. This spring unit 50 includes a stationary casing 52 having an elongated bore 54 and a closed wall 56 and an apertured opposite end wall 58. The bore 54 in the casing 52 is divided into separate compartments 60 and 62 by movable partition means 64 which fits closely yet longitudinally slidably upon an inner peripheral surface of the casing. The compartments 60 and 62 are filled with a gas under pressure and liquid, respectively. The movable partition means 64 is herein shown as a floating piston by way of example but the same may be a bellows or a diaphragm if desired. Where the floating piston is used as illustrated, it is preferable that a suitable sealing member such as an O-ring 66 be interposed between the inner peripheral wall of the casing and the floating piston so as to prevent the gas in the compartment 60 from escaping into the adjacent liquid compartment 62.

The liquid compartment 62 is further divided into two liquid chambers 68 and 70 by liquid separating partition means which is herein shown as a fixed partition member 72. This partition member 72 is fixed on the casing 52 through a suitably deformed portion 74 of the casing as illustrated but, if preferred, the same may be held in place by the aid of suitable retaining means such as a snap ring though not shown.

Main and auxiliary passages or apertures 76 and 78, respectively, are formed in the fixed partition member 72, providing liquid communication between the two liquid chambers 68 and 70 in the liquid compartment 62. A one-way check valve 80 is mounted on the partition member 72 in association with the main passage 76. The one-way check valve 80 is adapted to allow the flow of the liquid from the chamber 70 to the chamber 68 but to obstruct the flow of the liquid in the reverse direction. This one-way check valve 80 may be designed in any desired manner insofar as the above-mentioned function can be achieved but it is herein shown as made up of a resilient valve plate attached by a pin or bolt 82 to that surface of the partition member 72 by which the chamber 68 is defined. When, thus, a liquid pressure is exerted on this resilient valve plate from the liquid chamber 70, the valve plate is caused to warp away from the partition member thereby to open the main passage 76. When the liquid pressure is higher in the chamber 68 than in the chamber 70, the valve plate is forced against the partition member 72 so that the main passage 76 is closed by this valve plate.

A piston head 84 projects into the liquid compartment 62 or, more precisely, into the chamber 70 of the liquid compartment. The piston head 84 fits closely yet longitudinally slidably upon the inner peripheral surface of the casing 52 and is connected to a piston rod 86. The piston rod 86 extends outwardly of the casing 52 through the apertured end wall 58 thereof. The piston head 84 and the piston rod 86 thus form an integral piston unit.

Between the apertured end wall 58 and the piston head 84 is defined a suction chamber 88 for the reason to be discussed later. To facilitate the axial movement of the piston rod 86 through this suction chamber 88 and to assure hermetic sealing between the piston rod and the apertured end wall of the casing, an annular guide member 90 with an annular seal 92 embraced thereby may be mounted between the apertured end wall and the suction chamber. This guide member 90 is fixed on the casing 52 by means of a suitably deformed portion 94 of the casing as illustrated or by the use of suitable retaining means such as a snap ring, similarly to the fixed partition member 72.

The hydropneumatic spring unit 50 thus constructed is connected through the piston rod 86 to a fender 96.

Figure 4:
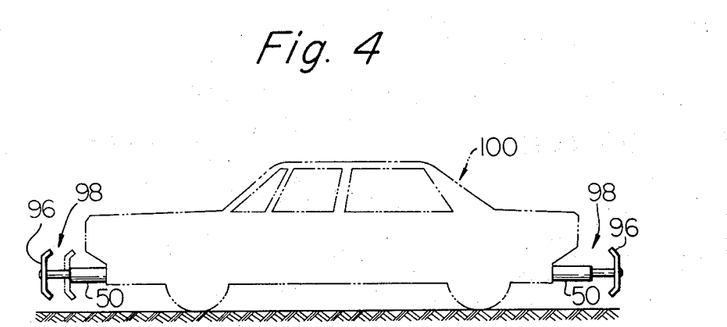
FIG. 4 is a side elevational view of an automotive vehicle, shown in phantom lines, which is equipped with bumpers using the impact absorptive device according to this invention.
Figure 5:
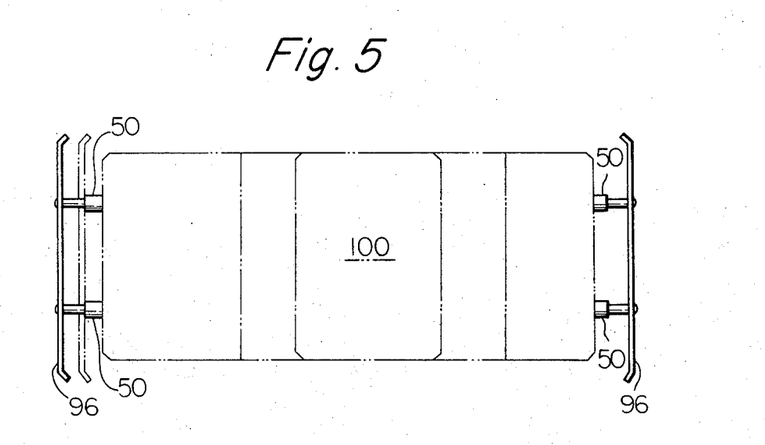
FIG. 5 is a top plan view of the automotive vehicle and the bumpers shown in FIG. 4.

The impact absorptive device according to this invention will find various p applications. FIGS. 4 and 5 illustrate an example of the arrangements where the impact absorptive device is utilized as a bumper 98 of an automotive vehicle which is generally indicated by reference numeral 100. Each of the front and rear bumpers 98 is shown to use a pair of hydro-pneumatic contractable spring units 50 which are connected to a single fender 96 but the number of the spring units to be used can be selected arbitrarily.

When, now, the automotive vehicle encounters a collision with an obstruction which may be a moving automobile or a fixed object, then the fender 96 is forced inwardly of the vehicle body so that the energy of the impact exerted on the fender is absorbed in the contraction of the hydroneumatic spring units 50. The operative condition of the hydropneumatic spring unit during the collision of the automotive vehicle is best seen in FIG. 3.

When, thus, the fender 96 is subjected to a force of an impact which is directed toward the hydropneumatic spring unit 50, the piston head 84 is forced toward the fixed partition member 72 through the piston rod 86. This causes the suction chamber 88 to be expanded and the liquid chamber 70 to be contracted. A vacuum develops in the suction chamber 88 and the pressure of the liquid in the liquid chamber 70 increases due to the resistance exercised by the one-way check valve 80 and to the restrictions on the flow of the liquid through the passages 76 and 78. The liquid in the chamber 70 is consequently forced into the adjacent liquid chamber 68 through the passages 76 and 78 with the check valve 80 now opened and, at the same time, a reactive force is imparted to the piston rod 86 from the liquid in the chamber 70. The liquid in the chamber 70 is in this manner passed to the chamber 68 in a volume which is substantially proportional to the displacement of the piston head 84 through the liquid chamber 70, thereby giving rise to the pressure of the liquid in the chamber 68. The floating piston 64 is now forced toward the closed end wall 56 of the casing 50 so that the gas compartment 60 is contracted and accordingly the pressurized gas therein is further compressed. The energy of the impact exerted on the fender 96 is thus consumed in the forced contraction of the gas compartment 60, namely, in compressing the gas in the gas compartment.

When the impact on the automotive vehicle calms down and the fender 96 is released from the force of impact, the gas compartment 60 starts to expand by the pressure accumulated in the gas therein, causing the floating piston 64 to move away from the closed end wall 56 of the casing 52. Since, in this condition, the one-way check valve 80 is forced against the fixed partition member 72 to close the main passage 76 and due to the restriction on the flow of the liquid through the auxiliary passage 78, the pressure in the liquid chamber 68 is now higher than the pressure in the other liquid chamber 70 with the result that the liquid in the chamber 68 is returned to the chamber 70 through the passage 78 at a limited rate until the pressures in the two liquid chambers are equalized. The piston head 84 is consequently moved away from the fixed partition member 72 until the piston rod 86 and the fender 96 restore the initial positions. This returning movement of the piston head 84 is assisted in by the suction which has been built up in the suction chamber 88.

Figure 6:
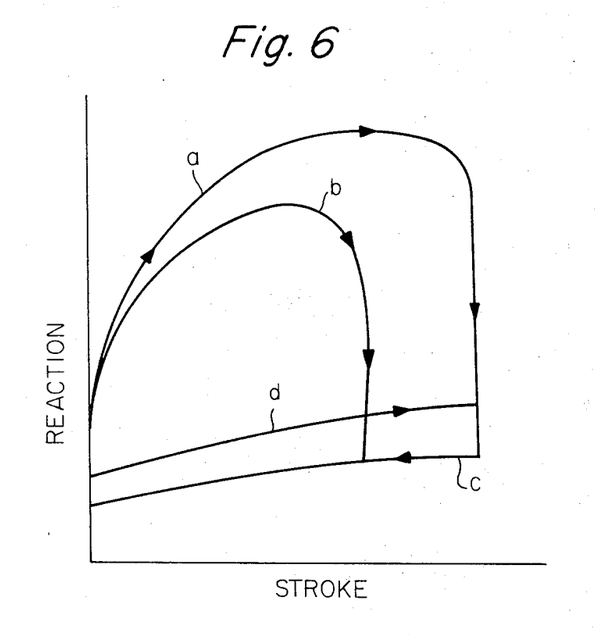
FIG. 6 is a view showing reaction-stroke characteristics curves attained by the impact absorptive device according to this invention.

FIG. 6 illustrates variations of the reaction imparted to the fender in terms of the stroke of the piston unit in which curves $a$ and $b$ indicate the variations of the reaction during collisions at relatively high and low relative velocities, respectively, while curve $c$ demonstrates the variation of the reaction on the fender as the piston unit is returned to the initial position. Curve $d$ shows the variation of the reaction caused when the spring unit is contracted in a static condition. As observed in FIG. 6, the reaction imparted to the fender 96 due to the restrictions on the flows of the liquid through the passages 76 and 78 when the liquid is being passed from the chamber 70 to the chamber 68 depends desirably upon the relative velocity of the collision encountered, thus providing increased degrees of shock absorbing and energy dissipating efficiencies. Because, moreover, the reaction on the fender is diminished at a limited rate as the piston unit is returned to the initial position, the fender is prevented from being rebounded when the collision condition is removed.

Figure 7:
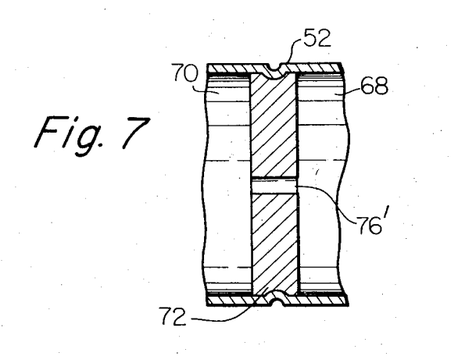
FIG. 7 is a fragmentary sectional view of a modification of the device shown in FIGS. 2 and 3.

The number of the passages to be formed in the liquid separating partition means 72 and the flow rate in each of the passages may be selected as desired. FIG. 7 illustrates an example in which only one passage, designated by numeral 76', is formed in the fixed partition member 72. The partition member 72 is, in this instance, void of the one-way check valve 80 used in the embodiment of FIGS. 2 and 3 so that the passage 76' is constantly kept open. The flow rate of the liquid through this passage 76' is substantially fixed whether the liquid is passed from the chamber 70 to the chamber 68 or vice versa though it depends upon the difference between the pressures in the two liquid chambers.

Figure 8:
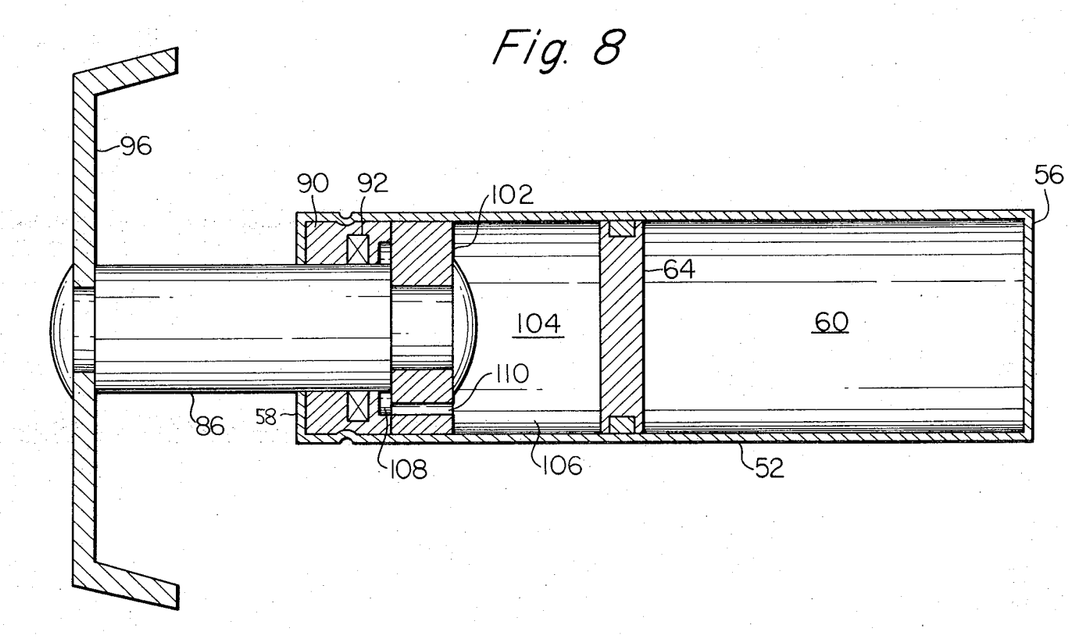
FIGS. 8, 9, 10 and 11 are longitudinal sectional views of other preferred embodiments of the impact absorptive device according to this invention.

FIG. 8 illustrates an embodiment in which the piston head takes part of the liquid separating partition means which is constituted by the fixed partition member 72 in the embodiment shown in FIGS. 2 and 3. The piston head, now designated by reference numeral 102, thus divides the liquid compartment, designated by numeral 104, into two liquid chambers 106 and 108. One liquid chamber 106 is adjacent the gas compartment 60 through movable partition means such as the floating piston 64 while the other liquid chamber 108 is adjacent the end plug 90. The piston head or liquid separating partition means 102 has formed therein a passage or bore 110 providing liquid communication between the liquid chambers 106 and 108, as illustrated.

When, in operation, the fender 96 is subjected to an impact and forced toward the casing 52 of the hydropneumatic spring unit thus constructed, the piston head or partition means 102 is moved away from the end plug 90 with the result that the liquid in the chamber 106 is passed to the chamber 108 at a limited rate through the passage 110 and, concurrently, the floating piston 64 is moved toward the closed end wall 56 of the casing in response to the rise in the pressure in the liquid chamber 106. A reaction is thus imparted to the fender 96 due to the restriction on the flow of the liquid through the passage 110.

Figure 9:
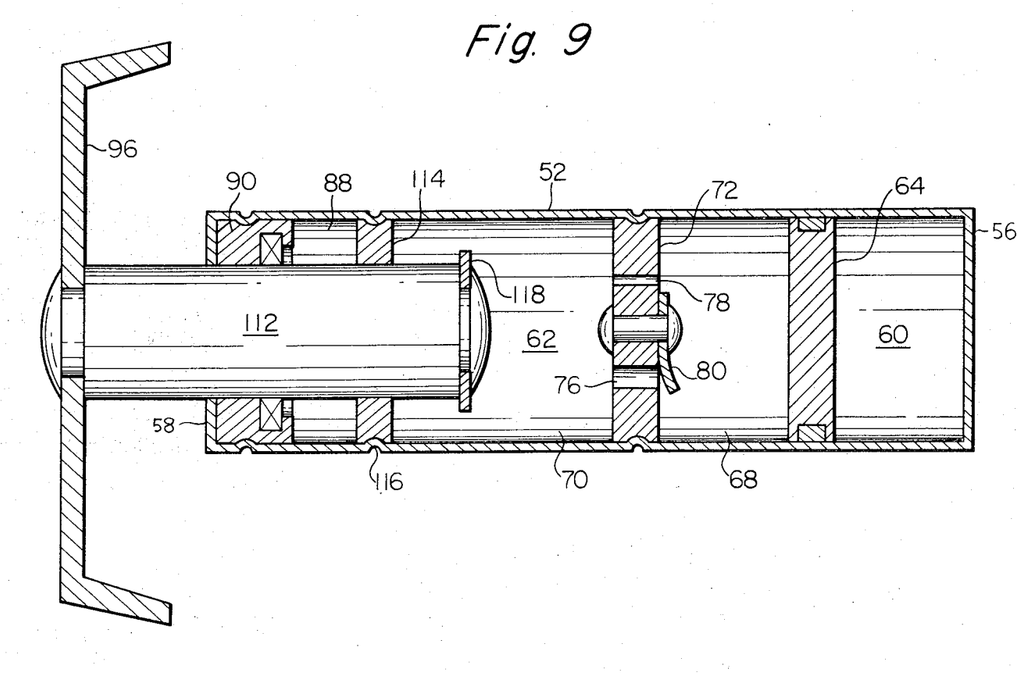

Shown in FIG. 9 is an embodiment which is essentially similar to the device shown in FIGS. 2 and 3 except in that the piston unit is comprised of a unitary plunger 112 which is void of the piston head 84 of the device of FIGS. 2 and 3. The plunger 112 projects into the liquid chamber 62 through the end plug 90 and the suction chamber 88 and is slidably supported by an intermediate guide member 114 which is fixed on the casing 52 by means of a circumferentially suitably deformed portion 116 as illustrated or by a snap ring, not shown. The returning movement of the plunger 112 is restricted by a stop member or ring 118 which is attached to the innermost end of the plunger. While the device shown in FIGS. 2 and 3 operates in such a manner that the contraction of the gas compartment 60 is caused by the displacement of the liquid from the liquid chamber 62 resulting from the inward movement of the piston head 84, the modified device shown in FIG. 9 operates in a manner that the variation in the volume of the portion of the plunger 112 occupying the liquid chamber 70 is compensated for by the contraction of the gas compartment 60. The device shown in FIG. 9 is thus advantageous especially where it is desired that the plunger 112 be moved over a relatively large distance of stroke.

Figure 10:
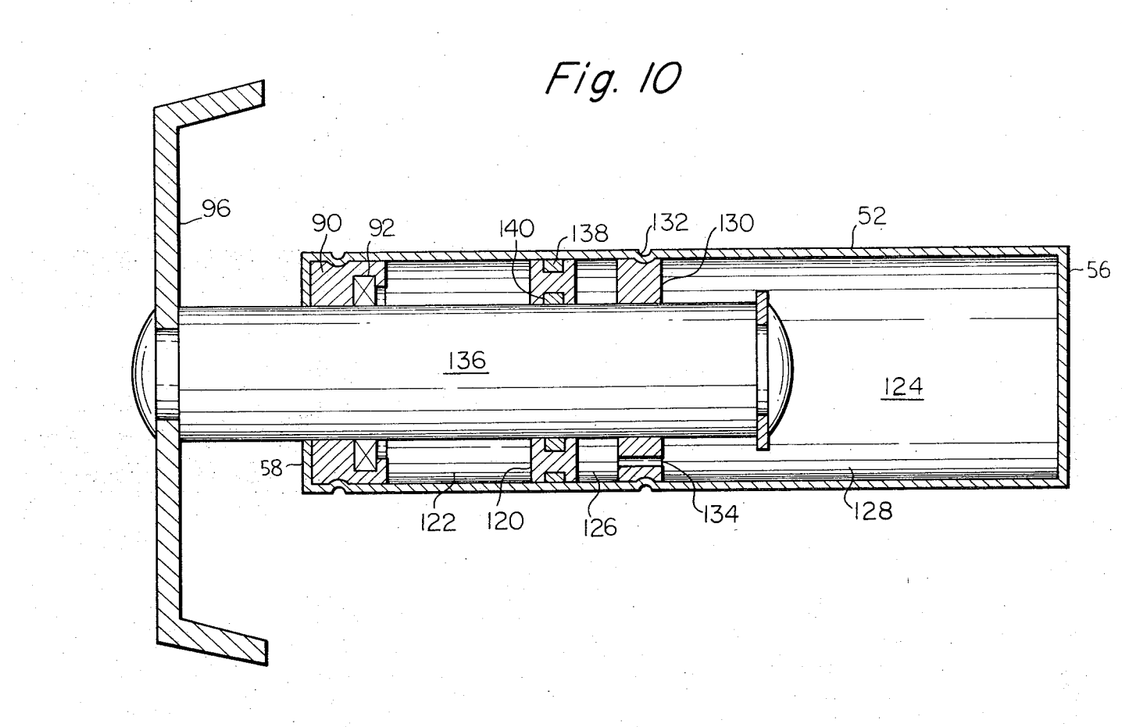

FIG. 10 illustrates an embodiment in which the relative positions of the gas and liquid compartments are inverted longitudinally. As shown, the casing 52 of the hydropneumatic spring unit is divided by movable partition means such as an apertured floating piston 120 into a gas compartment 122 adjacent the end plug 90 and a liquid compartment 124 adjacent the closed end wall 56 of the casing. The liquid compartment 124 is further divided into two liquid chambers 126 and 128 by liquid separating partition means which is herein shown as a fixed apertured partition member 130 fixed on the casing 52 in a manner similar to the partition member 72 of the device shown in FIGS. 2 and 3 such as through a circumferentially deformed portion 132. The fixed partition member 130 has formed therein a passage 134 through which the two liquid chambers 126 and 128 communicate with each other. A plunger 136 constituting a piston unit extends through the gas compartment 122 and the liquid chamber 126 into the liquid chamber 128 and is connected to the fender 96 through the seal 92, end plug 90 and apertured end wall 58 of the casing. The plunger 136 is axially slidably supported on and passed through the apertured floating piston 120 and fixed partition member 130. To prevent leakage of the gas in the gas compartment 122 or the liquid in the chamber 126, the floating piston 120 may be provided with an outer seal 138 embedded in its outer peripheral edge and an inner seal 140 embedded in its inner peripheral edge, as illustrated. The device thus constructed operates in a manner essentially similar to the device shown in FIG. 9 and, as such, no detailed discussion thereof will be herein incorporated.

Figure 11:
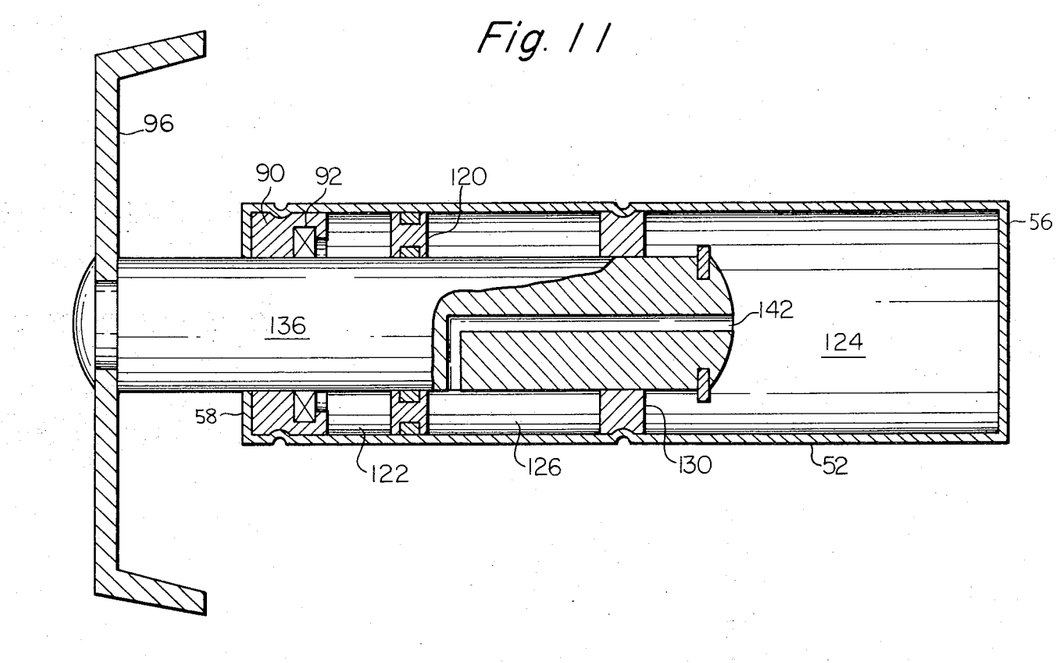

If desired, the fluid communication between the liquid chambers 126 and 128 may be provided by a passageway 144 which is formed in the plunger 136, as illustrated in FIG. 11.

In the devices shown in FIGS. 9 to 11, the reaction to be imparted to the fender is created by the liquid pressure exerted on the plunger projecting into the liquid chamber and the reaction-stroke characteristics attained thereby are generally similar to those indicated in FIG. 6.

It will now be appreciated from the foregoing description that the impact absorptive device according to this invention specifically features an ample capacity of absorbing the energy of the impact, a stabilized performance efficiency, compact and small-sized construction which is ready to be installed in a limited working space, and the position-restorable construction which permits repeated operation of the device. The thermal expansion of the liquid used is compensated for by the variation of the capacity of the gas compartment and, therefore, exercises no practical influence on the performance of the device over an extended period of time.

What is claimed is:

1. An impact absorption device comprising: a hollow cylinder having means defining a rod opening in one end; a partition member axially slidable in said cylinder dividing same into a first compartment containing therein a liquid and a second compartment containing therein a pressurized gas continuously biasing said partition in one direction; a piston axially movable in said first compartment dividing same into a first liquid chamber and a second liquid chamber adjacent said second compartment and separated therefrom only through the intermediary of said partition member so that when said piston moves in a direction towards said partition member said liquid is immediately pressurized and effects movement of said partition member in another direction opposite said one direction and effecting an increase in pressure of said pressurized gas; means defining a passage between said first liquid chamber and said second liquid chamber for flowing therethrough said liquid and permitting said piston to move thereby reducing the pressure of said liquid in said second liquid chamber; a piston rod connected to said piston and extending through said rod opening and said first liquid chamber; and a load bearing member connected to said piston rod externally of said cylinder for transferring an impact load applied thereto to said piston rod thereby effecting movement of said piston towards said partition member and therefore pressurization of said liquid in said second liquid chamber thereby moving said partition member in said another direction to increase the pressure of said pressurized gas in said second compartment whereby when said impact load is removed from said load bearing member said pressurized gas effects sliding of said partition member in said one direction and therefore pressurization of said liquid in said second chamber and movement of said piston in a direction away from said partition member.

2. An impact absorption device comprising: a hollow cylinder having means defining a rod opening in one end; a stationary partition member disposed in said cylinder dividing same into a first compartment and a second compartment; a piston axially movable in said first compartment dividing same into a first chamber and a second chamber, said second chamber containing therein a liquid which is pressurized by said piston when it moves toward said stationary partition member; a slidable partition member slidable in said second compartment and dividing same into a first section and a second section, said first section containing therein a liquid and said second section containing therein pressurized gas continuously biasing said slidable partition member in one direction, said slidable partition member effecting pressurization of said liquid in said first section when it moves in said one direction; means defining at least one passage in said stationary partition member for flowing therethrough said liquid to enable same to flow between said second chamber and said first section thereby permitting said piston to move towards said stationary partition member when the liquid pressure in said second chamber is greater than the liquid pressure in said first section thereby effecting movement of said slidable partition member in another direction opposite said one direction and increasing the pressure of said pressurized gas and permitting said slidable partition member to slide in said one direction with the liquid pressure in said first section is greater than the liquid pressure in said second chamber thereby effecting movement of said piston away from said stationary partition member; a piston rod connected to said piston and extending through said rod opening and said first chamber; and a load bearing member connected to said piston rod externally of said cylinder for transferring an impact load applied thereto to said piston rod thereby effecting movement of said piston towards said stationary partition member accompanied by the development of a vacuum in said first chamber and therefore pressurization of said liquid in said second chamber thereby increasing the pressure of said liquid in said first section and moving said slidable partition in said another direction to increase the pressure of said pressurized gas in said second section whereby when said impact load is removed from said load bearing member said pressurized gas effects sliding of said slidable partition member in said one direction and therefore pressurization of said liquid in said first section and said second chamber and movement of said piston assisted by the vacuum in said first chamber in a direction away from said stationary partition member.

3. An impact absorption device according to claim 2; including means defining at least one additional passage in said stationary partition member and a one-way check valve for permitting liquid flow through said one additional passage when said slidable partition member moves in said another direction and for preventing liquid flow through same when said slidable partition member moves in said one direction thereby causing said slidable partition member to slide in said one direction at a velocity slower than it slides in said another direction.

4. An impact absorption device comprising: a hollow cylinder having means defining a rod opening in one end; a first stationary partition member disposed in said cylinder dividing same into a first compartment and a second compartment; a second stationary partition member disposed in said first compartment dividing same into a first section and a second section and having means therein defining a rod opening therethrough, said second section containing therein a liquid; a slidable partition member slidable in said second compartment dividing same into a first chamber and a second chamber, said first chamber containing therein a liquid and said second chamber containing therein pressurized gas continuously biasing said slidable partition member in one direction, said slidable partition member effecting pressurization of said liquid in said first chamber when it moves in said one direction; a movable rod extending through said rod opening in said cylinder and through said rod opening in said second stationary member, said rod having sufficient size to effect pressurization of said liquid in said second section when said rod moves in a direction towards said first stationary partition member; means defining a passage in said first stationary partition member for flowing therethrough said liquid to enable same to flow between said first chamber and said second partition member thereby permitting said rod to move towards said stationary partition member thereby effecting an increase of pressure of the liquid in said second section and said first chamber and movement of said slidable partition member in another direction opposite said one direction and effecting an increase in pressure of said pressurized gas and for permitting said slidable partition member to slide in said one direction thereby effecting an increase in pressure of liquid in said first chamber and said second section and movment of said rod in a direction away from said first stationary partition member; and a load bearing member connected to said rod externally of said cylinder for transferring an impact load applied thereto to said rod thereby effecting movement of said rod towards said first stationary partition member and therefore pressurization of said liquid in said second section and said first chamber thereby moving said slidable partition member in said another direction to increase the pressure of said pressurized gas in said second chamber whereby when said impact load is removed from said load bearing member said pressurized gas effects sliding of said slidable partition member in said one directions and therfore pressurization of said liquid in said first chamber and said second section and movement of said rod in a direction away from said first stationary partition member.

5. An impact absorption device according to claim 4; including means defining at least one additional passage in said first stationary partition member and at least one one-way check valve for permitting liquid flow through said one additional passage when said slidable stationary member moves in said another direction and for preventing liquid communicating through same when said slidable stationary member moves in said one direction thereby causing said slidable partition member to slide in said one direction at a velocity slower than it slides in said another direction.

6. An impact absorption device comprising: a hollow cylinder having means defining a rod opening in one end; a stationary partition member dividing said cylinder into a first compartment and a second compartment and having means therein defining a rod opening therethrough, said second compartment containing therein a liquid; a slidable partition member slidable in said first compartment dividing same into a first chamber and a second chamber and having means therein defining a rod opening therethrough, said first chamber containing therein a liquid and said second chamber containing therein pressurized gas continuously biasing said slidable partition member in one direction, said slidable partition member effecting pressurization of said liquid in said first chamber when it moves in said one direction; a rod extending through the rod opening in said cylinder, said slidable partition member and said stationary partition member, said rod effecting pressurization of said liquid in said second compartment when it moves into said second compartment; means defining a passage between said first chamber and said second compartment for flowing therethrough said liquid to enable same to flow between said second compartment and said first chamber and permitting said rod to move into said second compartment thereby increasing the pressure of said liquid in said second compartment and said first chamber and movement of said slidable partition member in another direction opposite said one direction and effecting an increase in pressure of said pressurized gas and for permitting said slidable partition member to slide in said one direction thereby effecting an increase in pressure of the liquid in said first chamber and said second compartment and movement of said rod out of said second compartment; and a load bearing member connected to said rod externally of said cylinder for transferring an impact load applied thereto said rod thereby effecting movement of said rod into said second compartment and therefor pressurization of said liquid in said second compartment and said first chamber thereby moving said slidable partition member in said another direction to increase the pressure of said pressurized gas in said second chamber whereby when said impact load is removed from said load bearing member said pressurized gas effects sliding of said slidable partition member in said one direction and therefore pressurization of said liquid in said first chamber and said second compartment and movement of said rod out of said second compartment.

7. An impact absorption device according to claim 6: wherein said means defining a passage comprises means defining a passage in said stationary partition member.

8. An impact absorption device according to claim 6: wherein said means defining a passage comprises means defining a passage in said rod.

* * * * *